(12) United States Patent
Abel

(10) Patent No.: US 6,615,532 B2
(45) Date of Patent: Sep. 9, 2003

(54) FISH NET WITH LENGTH MEASURING SCALE

(76) Inventor: Jeff Abel, P.O. Box 895, Evanston, WY (US) 82931

( * ) Notice: Subject to any disclaimer, the term of this patent is extended or adjusted under 35 U.S.C. 154(b) by 0 days.

(21) Appl. No.: 10/015,487

(22) Filed: Dec. 11, 2001

(65) Prior Publication Data
US 2003/0106255 A1 Jun. 12, 2003

(51) Int. Cl.$^7$ ................................................ A01K 71/00
(52) U.S. Cl. ............................................ 43/7; 43/11
(58) Field of Search ............................ 43/7, 8, 10, 11, 43/12, 14, 1, 4; D22/135; 177/148, 131, 225, 233, 232; 33/483, 484, 485, 494

(56) References Cited

U.S. PATENT DOCUMENTS

| | | | |
|---|---|---|---|
| 1,474,804 A | | 11/1923 | Tyrrell |
| 2,600,773 A | * | 6/1952 | Hungerford ............. 43/12 |
| 2,633,351 A | * | 3/1953 | Fowle ................... 177/131 |
| 2,765,535 A | * | 10/1956 | Weber ..................... 33/760 |
| 3,077,237 A | * | 2/1963 | Nakayama ............ 177/245 |
| 3,259,988 A | | 7/1966 | Lunn |
| 4,619,654 A | * | 10/1986 | Abplanalp |
| 4,631,851 A | | 12/1986 | Whitehurst |
| 4,765,420 A | * | 8/1988 | Mengo ................... 177/149 |
| 4,876,818 A | | 10/1989 | Fralick et al. |
| 4,932,150 A | * | 6/1990 | Sher ........................... 43/7 |
| D315,318 S | * | 3/1991 | Hitchcock, II .......... D10/89 |
| 5,097,617 A | | 3/1992 | Craven |
| 5,148,607 A | | 9/1992 | Lasiter |
| 5,228,226 A | | 7/1993 | Porosky |
| 5,339,532 A | | 8/1994 | O'Keefe |
| 5,442,875 A | * | 8/1995 | Brundage et al. ........ 43/11 |
| 5,501,026 A | * | 3/1996 | Bryant et al. ............ 43/12 |
| 5,526,575 A | | 6/1996 | Hoover et al. |
| 5,637,838 A | | 6/1997 | Arey et al. |
| 5,854,447 A | | 12/1998 | Greenwood et al. |
| 5,970,620 A | | 10/1999 | Campbell |

FOREIGN PATENT DOCUMENTS

| | | | |
|---|---|---|---|
| EP | 105035 | * | 4/1984 |
| FR | 2582190 | * | 11/1986 |
| RU | 2110913 | * | 5/1998 |

OTHER PUBLICATIONS

Caddis Manufacturing, Inc. online catalog [online], 2000 [retrieved Oct. 9, 2002]. Retrieved from the Internet:<URL: http://www.caddis.com/Sports/u-shaped.htm>.*

* cited by examiner

Primary Examiner—Peter M. Pook
Assistant Examiner—David Parsley
(74) Attorney, Agent, or Firm—Thorpe North & Western, LLP

(57) ABSTRACT

A fish net, comprising a frame, and a net, attached to the frame, and including a length measuring scale disposed on the net, configured to allow a user to determine a size of a fish held in the net by visually comparing the fish with the length measuring scale. In one embodiment the length markings include a zero point near the bottom of the net, with two coordinated scales sharing the zero point and extending in opposing directions therefrom, such that a user may visually determine the length of the fish by aligning the fish with the length scale, and adding the numeral designations which are aligned with opposing ends of the fish.

18 Claims, 1 Drawing Sheet

FISH NET WITH LENGTH MEASURING SCALE

BACKGROUND OF THE INVENTION

1. Field of the Invention

The present invention relates generally to nets used in sport fishing. More particularly, the present invention relates to a sport fishing net with a length measuring scale incorporated into the net, such that a user may visually determine the length of a fish contained in the net.

2. Related Art

Sport fishing is a popular pastime, and, accordingly, the production of sport fishing equipment has become a very large industry. Catch-and-release fishing, for example, is one method which has grown in popularity, either by regulation in some areas, or by the voluntary action of fishermen.

Sport fishermen, especially when fly fishing, typically use a handheld fish net for scooping a fish out of the water. This is particularly true when fly fishing and when following catch-and-release procedures. Fly fishing practically requires netting because it is difficult if not impossible to land a fish without a net when fly fishing. When using a net or releasing a fish from a hook, it is desirable to subject the fish to as little handling as possible.

However, some handling is frequently necessitated by catch-and-release rules themselves. The rules regarding which fish must be released and which may be kept usually relate to the size of the fish, typically its length. Consequently, upon catching a fish and scooping it up in his net, a fisherman must remove the fish from the net (which is sometimes difficult because the fish is slippery, and is thrashing about), remove the hook from the fish, and place the fish adjacent to some measuring scale, such as a rigid ruler or flexible tape. Then, if the fish does not meet the length restrictions, the fisherman must put the fish back into the water.

All of these actions are difficult to perform, time consuming, and subject the fish to some level of trauma, sometimes needlessly. The time and trauma involved can sometimes lead to major injury, or even the needless death of the fish. Additionally, some fishermen, particularly novices, may desire a method of measuring a fish which does not require any physical handling of the fish at all.

SUMMARY OF THE INVENTION

It has been recognized that it would be advantageous to develop a very quick method of determining the length of a fish which has been caught.

It has also been recognized that it would be advantageous to develop a device for measuring the length of a fish which reduces or eliminates human handling of the fish.

The invention advantageously provides a fish net, comprising a frame, and a net attached to the frame. Disposed on the net is a length measuring scale, configured to allow a user to determine a size of a fish held in the net by visually comparing the fish with the length measuring scale.

In accordance with a more detailed aspect of the present invention, in one embodiment the length markings include a zero point near the bottom of the net, with two coordinated scales sharing the zero point and extending in opposing directions therefrom, such that a user may visually determine the length of a fish by aligning the fish with the length scale, and adding the numeral designations which are aligned with opposing ends of the fish.

In accordance with another aspect thereof, the invention advantageously provides a method for measuring a fish, comprising the steps of: (a) placing a fish within a fish net having a length measuring scale therein; and (b) visually comparing the fish to the length measuring scale, so as to determine the size of the fish.

Additional features and advantages of the invention will be apparent from the detailed description which follows, taken in conjunction with the accompanying drawings, which together illustrate, by way of example, features of the invention.

DETAILED DESCRIPTION

Figure 1:
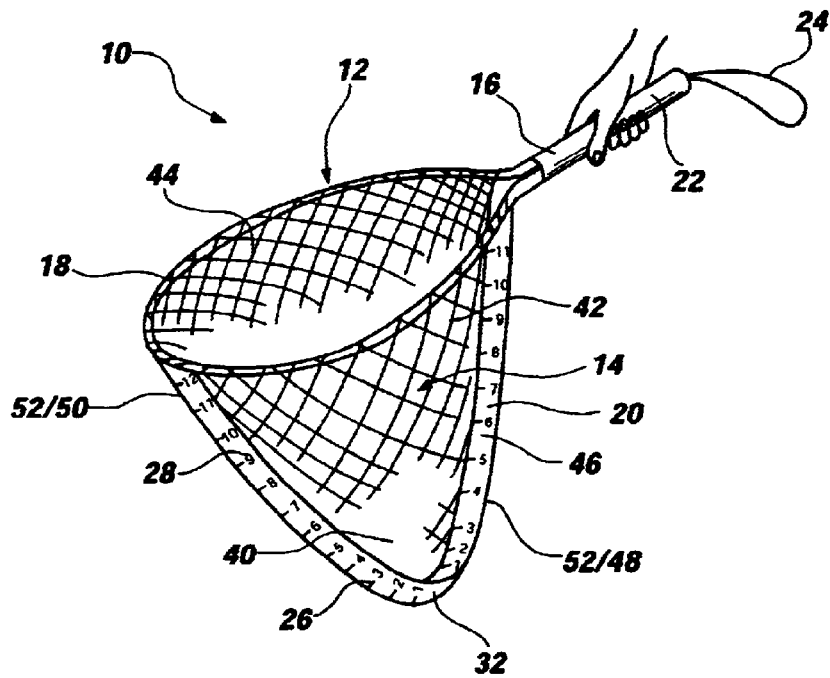
FIG. 1 is a perspective view of a fish net with length measuring scale in accordance with one embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As illustrated in FIG. 1, in one embodiment, the fish net with length measuring scale invention described herein generally comprises a sport fishing net 10 having a frame 12, and a net 14 attached to the frame. In the embodiment shown in FIG. 1, the frame includes a handle 16, and a substantially closed loop portion 18 attached to the handle, the net 14 being attached to and hanging from the closed loop portion 18. It will be apparent that the frame could be configured in various ways other than that shown. However, the configuration shown in FIG. 1 is fairly typical of sport fishing nets, and will be familiar to many likely users.

The frame 12 may be formed of various materials, including aluminum, steel, wood, etc. The handle 16 is preferably provided with a rubber or rubber-like gripping surface 22, and may also include a loop 24 or other device which may serve as a safety strap, and may also be used for hanging storage of the net.

Disposed in a generally linear configuration along a surface of the net 14 is a length measuring scale 20, which may extend from one side to an opposing side of the closed loop portion 18. The orientation or alignment of the measuring scale relative to the frame of the fish net may vary. As shown in FIG. 1, the length measuring scale extends from near the junction of the handle 16 and the closed loop portion 18. It will be apparent, however, that the length measuring scale could be oriented substantially transverse to the handle, or in many other orientations.

The length measuring scale 20 includes a series of length markings 26 and numeral designations 28. In one embodiment, the length markings 26 represent standard units of length, such as inches, centimeters, etc. With the net configured in this way, a user can easily determine the size of a fish held in the net by aligning the fish with the length measuring scale, and visually comparing the fish with the length measuring scale to determine its length in the units of the scale.

Figure 2:
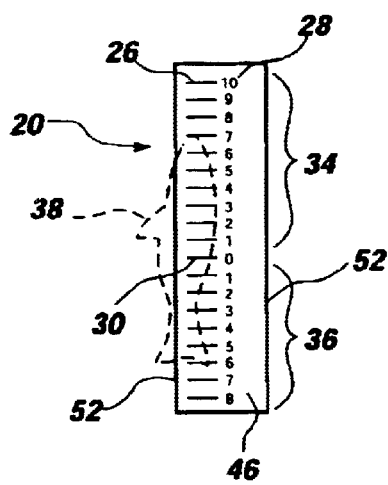
FIG. 2 is a close-up flattened-out view of the length measuring scale of the fish net of FIG. 1.

Referring to FIG. 1 and FIG. 2, the measuring scale 20 preferably includes a zero point 30 approximately in the center of the scale, which makes it particularly easy to use. The zero point is preferably located near the bottom 32 of the net, and the measuring scale 20 comprises two coordinated scales 34, 36 sharing the zero point, and extending in opposite directions therefrom.

In this configuration, a user can easily visually determine the length of a fish 38 (shown in outline) by substantially aligning the fish with the length measuring scale 20, and adding the numeral designations 28 which are approximately aligned with opposing ends of the fish. For example, as shown in the flattened-out view of FIG. 2, the ends of the fish 38 approximately line up with the numerals 7 and 6. Accordingly, if the length markings represent inches, the length of the fish is equal to approximately 13 inches.

It will be apparent that the length measuring scale 20 could be configured in other ways as well. For example, the zero point 30 could be at one end of the scale, such that upon viewing the numeral designations 28 which align with each end of the fish 38, the user must subtract the smaller numeral from the larger to determine the length of the fish. It will be apparent that the zero point could be at other locations as well.

Modified or non-standard units of length may be used in the length measuring scale 20, for reasons that will be more apparent hereafter. For example, the length units may be larger or smaller than standard length units. Alternatively, the length units may be graduated or non-linear, such that the distance between adjacent length markings 26 gradually increases or decreases as one moves along the scale in a given direction-relative to the zero point. Similarly, the numeral designations could be any type of numerals, and are not limited to the set of Arabic numerals used by those who speak English.

In order to facilitate the rapid and easy alignment of the fish 38 with the measuring scale 20, the net 14 is preferably configured to form a pocket 40 into which the fish will naturally tend to rest in substantial linear alignment with the length measuring scale. In other words, it is preferable that the shape of the net be such as to naturally cause the fish to drop into a position aligned with the scale when a user scoops up a fish therein. If, upon initial placement of the fish in the net, the fish is not adequately aligned with the length measuring scale, the user may simply move the fish or juggle the net slightly to cause the fish to attain the desired alignment.

In one embodiment, forming the net into a pocket as describe is accomplished by assembling the net from first and second side pieces 42 and 44, and a substantially linear center piece 46. These three pieces are joined or sewn together along their edges. The first and second side pieces have curved edges 48 and 50, while the center piece has substantially linear side edges 52. Joining these edges thus forms an elongate pocket 40 into which a fish naturally tends to rest when scooped up into the net.

The net 14 may be made from any material which is flexible and strong enough for use as a fish net, which will not damage a fish, and which will allow water to freely flow through it. The side pieces 42 and 44 may be of the same material as the center piece 46, or they may be made of different materials. Suitable materials for the side pieces include a wide variety of mesh or net materials, such as cotton, nylon, and other polymer materials such as polypropylene rubber. Other materials may also be used. The same materials may be used for the center piece, with the additional requirement that the material of the center piece must be suitable for application of the length measuring scale thereto, whether by printing, marking, weaving, embroidery, etc., as discussed below. It will be apparent that some net materials may be unsuitable for having markings applied with inks, dyes, or silk screening, unless the characters in the markings are intended to be quite large.

The length measuring scale 20 may be disposed on the fish net 14 in various ways. In one embodiment, he length markings 26 and numerals 28 are woven into he fabric of the net, possibly using a different color or type of material to form the woven markings and numerals. This approach allows the markings and numerals to be visible on both sides of the net fabric, and makes the measuring scale equally useful regardless of whether a user inverts the net from a given orientation. However, it will be apparent that the numerals will present a mirror image when viewed on one side, when compared to the other. This method also tends to produce a durable scale, with length markings and numerals which cannot be merely rubbed off.

Alternatively, the length markings 26 and numerals 28 may be applied to the surface of the net 14 using a silk-screen or printing process, which applies the markings with inks, dyes, etc. There are a variety of these processes, and they are well known. The construction of the net using a substantially linear center piece 46, as described above, facilitates this approach by allowing printing on a flat, straight piece of material. It will be apparent, however, that the success of this approach may depend upon the nature of the net material where the scale is placed. It will also be apparent that the markings and numerals may not be as readily visible on one side of the net fabric unless the marking scale is printed on both sides. As yet another alternative, the length markings and numerals could be embroidered onto the fabric of the net. As in the case of the woven markings, this approach also produces a durable scale.

Figure 3:
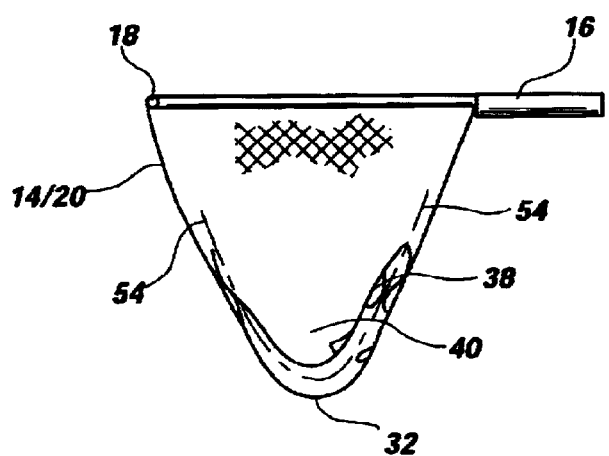
FIG. 3 is a side sectional view of the fish net of FIG. 1, having a fish held in the bottom of the net in alignment with the measuring scale, illustrating the effects of curvature induced inaccuracy.

As noted above, the length measuring scale may comprise modified units of length. Referring to FIG. 3, this may be done to compensate for relative curvature of the fish 38 and the length measuring scale 20. It will be apparent that, when a fish is held in a fish net of the type illustrated in FIG. 1, it will tend to rest on its side in the bottom of the net 32, in a curved position, as shown in FIG. 3. When a fish is measured on a flat scale, its thickness does not substantially affect its apparent length. However, when curved and resting in the bottom of a net, the central axis 54 of the fish 38 is offset from the scale 20 due to the thickness of the fish, and, since the central axis and the scale are both curved, the fish may appear to be longer than it really is.

Consequently, the distance between the length markings 26 may be modified to compensate for this curvature-related error. For example, if the scale 20 is intended to be in inches, each length marking may be slightly more than one inch from its adjacent marking so that the fish will not appear to be longer than it is. The actual variation in the distance between markings may be determined by trial and error. Additionally, because the difference may vary depending on the type of fish, nets with different modified units may be made for different types of fish.

Additionally, because the error may depend on the thickness of the fish, longer fish may tend to introduce more error because they will generally include thicker portions. Thus, a length measuring scale 20 in which the units are modified in a nonlinear manner may be desirable. For example, a graduated or semi-logarithmic scale may be disposed on the net 14, such that the distance between length markings gradually increases with distance from the zero point 30. Other variations may also be used. Because there is little visible difference between them, the length measuring scales depicted in FIGS. 1 and 2 are intended to represent all length measuring scales described herein, whether based on standard or constant units, or modified units.

It is to be understood that the above-described arrangements are only illustrative of the application for the principles of the present invention. Numerous modifications and alternative arrangements can be devised without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A fish net, comprising:
   a. a frame;
   b. a net, attached to the frame, and having a bottom and a top; and
   c. a length measuring scale, permanently disposed generally linearly on a surface of the net, having a zero point near the bottom of the net, with two coordinated scales sharing the zero point and extending in opposing directions therefrom to the top of the net, such that a user may determine a size of a fish held in the net by visually comparing the fish with the length measuring scale.

2. A fish net, comprising:
   a. a frame;
   b. a net, attached to the frame, having a bottom and a top; and
   c. a length measuring scale, permanently disposed generally linearly on a surface of the net, including length markings, representing standard units of length, and numeral designations associated with the length markings, the length markings including a zero point near the bottom; with two coordinated scales sharing the zero point and extending in opposing directions therefrom to the top of the net whereby a user may visually determine a length of the fish by substantially aligning the fish with the length scale, and adding the numeral designations which are approximately aligned with opposing ends of the fish.

3. A fish net in accordance with claim 2, wherein the length measuring scale includes length markings representing modified units of length to compensate for curvature of the fish and the length measuring scale.

4. A fish net in accordance with claim 2, wherein the net forms a pocket in which the fish naturally tends to rest in substantial linear alignment with the length measuring scale.

5. A fish net in accordance with claim 2, wherein the frame further comprises a substantially closed loop portion having opposing sides, and the length measuring scale extends from one side of the closed loop to the opposing side.

6. A fish net in accordance with claim 2, wherein the net further comprises:
   a. first and second side pieces with curved edges;
   b. a substantially linear center piece, having side edges, the length measuring scale being disposed on the center piece; and
   c. the side edges of the center piece being connected to the curved edges of the first and second side pieces, forming a pocket in which the fish naturally tends to rest in substantial linear alignment with the length measuring scale.

7. A fish net in accordance with claim 6, wherein the first and second side pieces and the center piece are of the same material.

8. A fish net in accordance with claim 6, wherein the first and second side pieces and the center piece are of different materials.

9. A fish net in accordance with claim 6, wherein the center piece is of a material selected from the group consisting of: mesh and net materials of cotton and polymers.

10. A fish net in accordance with claim 2, wherein the net is of a material selected from the group consisting of: mesh and net materials of cotton and polymers.

11. A fish net in accordance with claim 2, wherein the length measuring scale is disposed on the net by a process selected from the group consisting of: weaving into the material of the net; embroidering onto the material of the net; printing on the material of the net; and silk-screening onto the material of the net.

12. A fish net in accordance with claim 2, wherein the frame further comprises:
   a. a handle; and
   b. a substantially closed loop portion, attached to the handle, the net being attached to the loop portion.

13. A fish net, comprising:
   a. a frame having:
      i. a handle; and
      ii. a substantially closed loop portion, having opposite sides, attached to the handle;
   b. a net, attached to the loop portion, having a bottom and a top; and
   c. a length measuring scale, having length markings with numeral designations representing units of length, disposed generally linearly on the net and extending from one side of the loop portion to an opposing side thereof, the length markings including a zero point near the bottom, with two coordinated scales sharing the zero point and extending in opposing directions therefrom to the top of the net, the net forming a pocket into which a fish naturally tends to rest in substantial linear alignment with the measuring scale, such that a user may determine a size of the fish held in the net by visually comparing the fish with the numeral designations on the length measuring scale and adding the numeral designations which are approximately aligned with opposing ends of the fish.

14. A fish net in accordance with claim 13, wherein the length measuring scale includes length markings representing modified units of length to compensate for relative curvature of the fish and the length measuring scale.

15. A fish net in accordance with claim 13, wherein the net is of a material selected from the group consisting of: mesh and net materials of cotton and polymers.

16. A fish net in accordance with claim 13, wherein the length markings represent standard units of length.

17. A method of measuring a size of a fish, comprising the steps of:

a. placing a fish within a fish net having a frame and a net having a top and a bottom, and a length measuring scale disposed on the net, the length measuring scale including a zero point approximately at a bottom of the net, and two coordinated scales with numeral designations sharing the zero point and extending in opposing linear directions therefrom to the top of the net;

b. aligning the fish with respect to the length measuring scale; and c. visually comparing the fish to the length measuring scale by adding the numeral designations which are approximately aligned with opposing ends of the fish, so as to determine a size of the fish.

18. A method in accordance with claim 17, wherein the step of placing the fish within the fish net further comprises causing the fish to rest in a bottom of the net in substantial linear alignment with the length scale.

* * * * *